United States Patent
Basu Mallick et al.

(10) Patent No.: US 10,785,802 B2
(45) Date of Patent: Sep. 22, 2020

(54) TRANSMITTING SR PRIOR TO COMPLETING RACH

(71) Applicant: Motorola Mobility LLC, Chicago, IL (US)

(72) Inventors: Prateek Basu Mallick, Langen (DE); Joachim Loehr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/973,104

(22) Filed: May 7, 2018

(65) Prior Publication Data

US 2018/0324867 A1 Nov. 8, 2018

Related U.S. Application Data

(60) Provisional application No. 62/501,902, filed on May 5, 2017.

(51) Int. Cl.
*H04W 74/08* (2009.01)
*H04W 72/12* (2009.01)

(52) U.S. Cl.
CPC ... *H04W 74/0833* (2013.01); *H04W 72/1242* (2013.01)

(58) Field of Classification Search
None
See application file for complete search history.

(56) References Cited

U.S. PATENT DOCUMENTS

| 10,448,375 | B2 * | 10/2019 | Suzuki | H04W 72/12 |
|---|---|---|---|---|
| 2010/0232364 | A1 * | 9/2010 | Hsu | H04W 74/085 370/328 |
| 2012/0057547 | A1 * | 3/2012 | Lohr | H04L 5/0007 370/329 |
| 2012/0176967 | A1 * | 7/2012 | Kim | H04W 76/36 370/328 |

(Continued)

FOREIGN PATENT DOCUMENTS

WO   WO-2014089090 A1 *   6/2014   ........... H04W 72/12

OTHER PUBLICATIONS

Lenovo, Motorola Mobility, "Differentiation of RA parameters", 3GPP TSG-RAN WG2 2018 NR Ad-hoc Meeting#1 R2-1800713, Jan. 22-26, 2018, pp. 1-3.

(Continued)

*Primary Examiner* — Otis L Thompson, Jr.
(74) *Attorney, Agent, or Firm* — Kunzler Bean & Adamson

(57) ABSTRACT

For handling multi UL access procedures, methods, apparatus, and systems are disclosed. One apparatus includes a processor and a transceiver for communicating with a mobile communication network using a plurality of radio bearers. The processor initiates a first random-access procedure for a first radio bearer. The processor receives a scheduling request trigger for a second radio bearer while the first random-access procedure remains pending. The processor determines whether simultaneous scheduling request transmission is permitted, wherein the transceiver transmits a first scheduling request message for the second radio bearer in response to simultaneous scheduling request transmission being permitted.

19 Claims, 8 Drawing Sheets

(56) References Cited

U.S. PATENT DOCUMENTS

| | | | |
|---|---|---|---|
| 2012/0213089 A1* | 8/2012 | Shi | H04L 5/001 370/241 |
| 2012/0302274 A1* | 11/2012 | Ohta | H04W 72/042 455/509 |
| 2013/0070700 A1* | 3/2013 | Chang | H04W 74/08 370/329 |
| 2013/0136073 A1* | 5/2013 | Kato | H04L 5/0007 370/329 |
| 2013/0208711 A1* | 8/2013 | Van Lieshout | H04B 1/406 370/336 |
| 2013/0242730 A1 | 9/2013 | Pelletier et al. | |
| 2013/0294310 A1* | 11/2013 | Yi | H04W 74/002 370/311 |
| 2015/0230135 A1* | 8/2015 | Yang | H04L 5/0055 370/331 |
| 2016/0057800 A1* | 2/2016 | Ingale | H04W 56/0005 370/216 |
| 2016/0374104 A1* | 12/2016 | Watfa | H04W 36/0011 |
| 2017/0290042 A1* | 10/2017 | Islam | H04W 72/1252 |
| 2018/0049245 A1* | 2/2018 | Islam | H04W 74/0833 |
| 2018/0206271 A1* | 7/2018 | Chatterjee | H04L 5/0053 |
| 2018/0324844 A1* | 11/2018 | Babaei | H04W 74/08 |
| 2018/0324872 A1* | 11/2018 | Babaei | H04W 72/1284 |
| 2019/0191464 A1* | 6/2019 | Loehr | H04W 72/14 |
| 2019/0215783 A1* | 7/2019 | Chakraborty | H04W 52/34 |
| 2019/0239283 A1* | 8/2019 | Kwak | H04W 74/0833 |
| 2019/0313462 A1* | 10/2019 | Lin | H04W 74/0833 |
| 2020/0059959 A1* | 2/2020 | Turtinen | H04W 74/004 |
| 2020/0084790 A1* | 3/2020 | Wang | H04W 74/0833 |

OTHER PUBLICATIONS

InterDigital Communications, "Random Access Procedure in NR", 3GGP TSG-RAN WG2 Meeting #97bis R2-1702869, Apr. 3-7, 2017, pp. 1-2.

Qualcomm Incorporated, "Prioritized Random Access in NR", 3GPP TSG-RAN WG2 Meeting #98 R2-17xxxx, May 15-19, 2017, pp. 1-4.

InterDigital Communications, "PRACH Prioritization and Handling", 3GPP TSG-RAN WG1 #79 R1-144216, Oct. 6-10, 2014, pp. 1-6.

PCT/US2018/031420, Notification Transmittal of the International Search Report and the Written Opinion of the International Searching Authority, or the Declaration, dated Jul. 24, 2018, pp. 1-16.

Convida Wireless, "Convida Views on SR/BSR Enhancements", 3GPP TSG-RAN WG2 Meeting #97bis R2-1703692, Apr. 3-7, 2017, pp. 1-4.

Huawei, HiSilicon, "Considerations on RACH Procedure", 3GPP TSG-RAN WG2 Meeting #97bis R2-1702599, Apr. 3-7, 2017, pp. 1-4.

3GPP TS 36.321 V8.0.0 (Dec. 2007), "3rd Generation Partnership Project; Technical Specification Group Radio Access Network; Evolved Universal Terrestrial Radio Access (E-UTRA) Medium Access Control (MAC) Protocol Specification (Release 8)", pp. 1-23.

3GPP TS 23.501 V0.3.0 (Feb. 2017), "3rd Generation Partnership Project; Technical Specification Group Services and System Aspects; System Architecture for the 5G System; Stage 2 (Release 15)", pp. 1-97.

* cited by examiner ics TRANSMITTING SR PRIOR TO
COMPLETING RACH

CROSS-REFERENCE TO RELATED APPLICATIONS

This application claims priority to U.S. Provisional Patent Application No. 62/501,902 entitled "Efficient handling of Multiple UL Access Procedures" and filed on May 5, 2017 for Prateek Basu Mallick, Joachim Loehr, and Ravi Kuchibhotla which is incorporated herein by reference.

FIELD

The subject matter disclosed herein relates to electronic communications and more particularly relates to handling multi UL access procedures.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Backoff Indicator ("BI"), Bandwidth Part ("BWP"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Convergence Protocol ("PCDP"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/ Splitting Function ("SSF"), Scheduling Request ("SR"), Serving Gateway ("SGW"), Session Management Function ("SMF"), System Information ("SI"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/ Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

Some wireless communication systems, only one Random Access procedure can be ongoing at any point in time in a MAC entity. If the MAC entity receives a request for a new Random-Access procedure while another is already ongoing in the MAC entity, it is up to the UE implementation whether to continue with the ongoing procedure or start with the new procedure.

BRIEF SUMMARY

Methods for handling multi UL access procedures are disclosed. Apparatuses and systems also perform the functions of the methods. One method (e.g., of a user equipment) for handling multi UL access procedures includes initiating, by a remote unit, a first random-access procedure for a first radio bearer and receiving, at the remote unit, a scheduling request trigger for a second radio bearer while the first random-access procedure remains pending. The first method also includes determining whether simultaneous scheduling request transmission is permitted and transmitting, by the remote unit, a first scheduling request message for the second radio bearer to a mobile communication network in response to simultaneous scheduling request transmission being permitted.

Another method for handling multi UL access procedures includes initiating, by a remote unit, a first random-access procedure for a first radio bearer and receiving, at the remote unit, a scheduling request trigger for a second radio bearer while the first random-access procedure remains pending. The second method includes transmitting, by the remote unit, a first scheduling request message for the second radio bearer to a mobile communication network prior to completing the first random-access procedure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
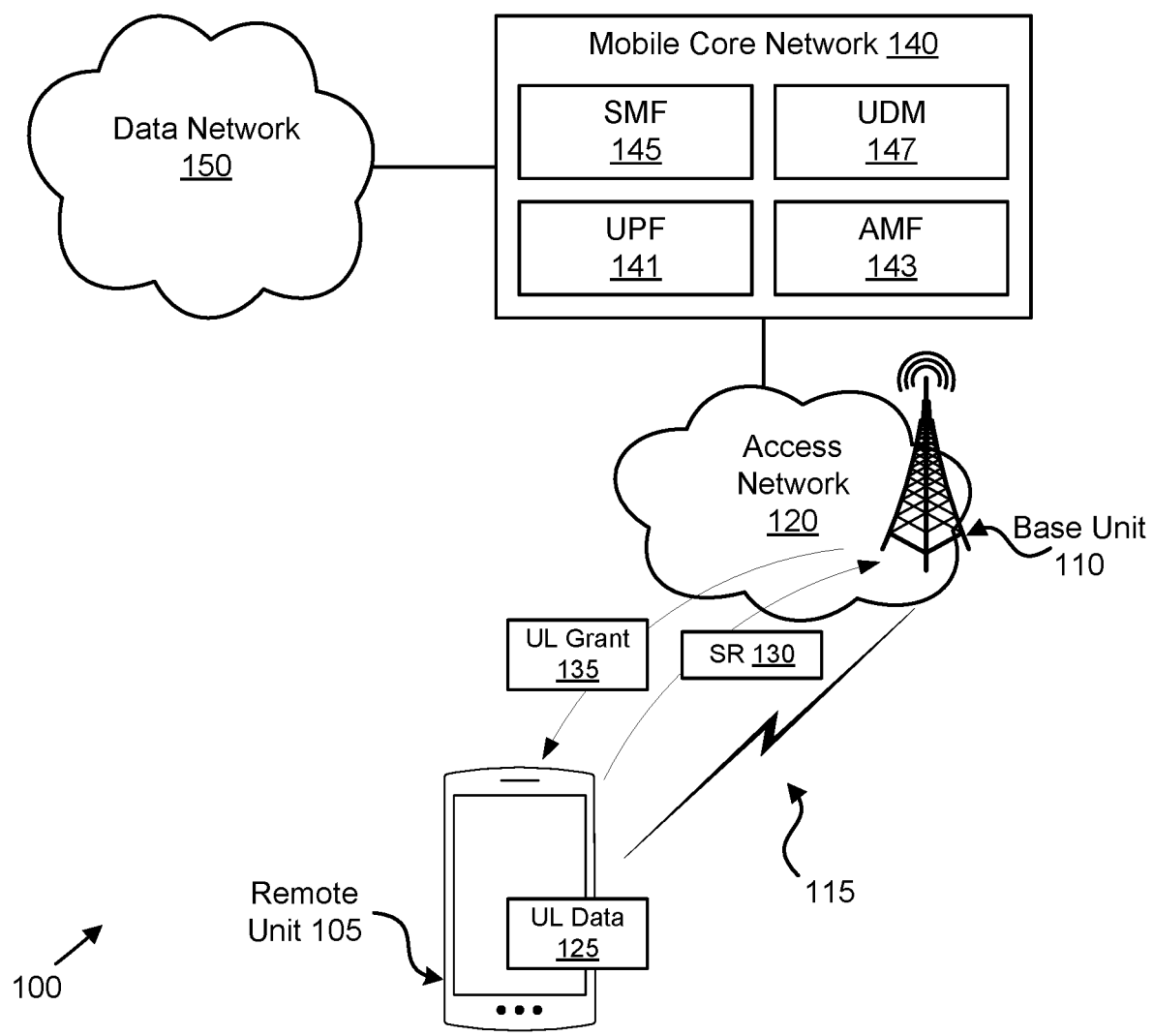
FIG. 1 is a schematic block diagram illustrating one embodiment of a wireless communication system for handling multi UL access procedures.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In LTE, only one Random-Access procedure can be ongoing at any point in time in a MAC entity. If the MAC entity receives a request for a new Random-Access procedure while another is already ongoing in the MAC entity, it is up to the UE implementation whether to continue with the ongoing procedure or start with the new procedure. In NR, a possible new reason to initiate a RACH procedure could be to send the SI-request message (Msg1 or Msg3 based method). The UE implementations aborting a corresponding RACH procedure for sending SI-request message would run the risk of delaying among others a public safety, vehicular and other critical services. For example, "aborting" the RACH procedure in Msg1 may mean that the UE does not even send the reserved preamble (for requesting a corresponding SIB), but rather waits for the other RACH procedure to complete—depending on the radio condition this may be a relatively long wait. However, "aborting" the RACH procedure in Msg3 may not be straightforward if the Msg3 grant size is different for SI-request and other purposes (e.g., UL grant).

To minimize delay, the UE may continue multiple RACH procedures in parallel when said RACH procedures are considered prioritized. One example is initiating multiple RACH procedures, each for a different SI request. However, if both RACH procedures are not considered prioritized, then the UE may cancel/abort the lesser priority procedure (e.g., non-SI request). In certain embodiment, continuing multiple RACH procedures in parallel includes transmitting multiple transmissions at the same time instant/slot/subframe.

In some embodiments, the multiple pending RACH procedures may have different priorities. Assume here, that a second RACH procedure is triggered while a first RACH procedure is already pending. Here, the UE may determine whether the pending RACH procedures request system information (SI-requests having higher priority than other RACH procedures) and determine whether the required SIB is considered "important" or "critical" Examples of important/critical SIBs include, but are not limited to, SIBs like Commercial Mobile Alert System ("CMAS"), Wireless Emergency Alerts ("WEA"), Earthquake and Tsunami Warning System ("ETWS"), vehicular, public safety, or any other critical communication.

If the first RACH procedure was started already and did not require an important/critical SIB, then the UE may cancel/abort the first RACH procedure and initiate a second RACH procedure for requesting SI, especially if the required SIBs are one of the important/critical SIBs. Note that if for the first RACH procedure the UE already transmitted Msg1 for requesting SIB(s), then the UE shall not abort the first RACH procedure. Rather, the UE may send Msg1 for the second RACH procedure at the next RACH opportunity, without waiting to complete the first RACH procedure.

In some embodiments, the multiple pending RACH procedures may have the same priority. Assume again that the second RACH procedure is triggered while the first RACH procedure is already pending. Here, multiple RACH procedures may be initiated for requesting SIBs where each (group of) SIB is linked to a corresponding Preamble.

If more than one SIBs are required and belong to different corresponding Preamble, then the UE may initiate a simultaneous Preamble transmission. However, in certain embodiments the transmit power required for all such transmission is not available/allowed in the UE. Therefore, the UE may initiate Preamble transmission sequentially (e.g. one by one). In this enhancement, the UE initiates transmission of a subsequent Preamble in the immediate next RACH opportunity, e.g., without having to wait for to receive the response (Msg2) corresponding to a previous Preamble.

In some embodiments, the UE may receive more than one Msg3 grants overlapping in time domain. Moreover, the UE may not be able to simultaneously transmit all Msg3s with the required power (e.g., based on the last ramped-up Preamble transmission power). In such embodiments, the UE may prioritize one RACH access over other. For example, a SI-request may be prioritized over other Random accesses, such that the UE uses the required power for the Msg3 transmission corresponding to the prioritized RACH access and use the remaining power for the other Msg3 transmission. Alternatively, the UE may use equal transmit power for all simultaneous Msg3 transmission. As another alternative, the UE may make a Msg3 transmission only for the higher priority RACH access and send no Msg3 transmission for the other RACH access.

In certain embodiments, the UE may prioritize one RACH access (as determined above) for an initial Msg3 transmission, but on re-transmission opportunities (e.g. if the Asynchronous re-transmission opportunities still collide) the UE prioritizes the 'other' RACH access instead. In other embodiments, the UE may use some weighing factor in proportion to their priorities for distributing power for each of the RACH accesses. Here, the network may control the configuration of such "weighing factors".

In some embodiments, a Scheduling Request ("SR") is used for the UE to request uplink shared channel ("UL-SCH") resources for new transmission. A SR configuration includes a set of PUCCH resources for SR across different bandwidth parts ("BWPs") and cells. Each SR configuration corresponds to one or more logical channels. Each logical channel may be mapped to zero or one SR configuration, e.g., as configured by RRC. Only PUCCH resources on a BWP which is active at the time of SR transmission occasion are considered valid.

After sending a SR, the UE is expected to send a Buffer Status Report ("BSR"). The RAN uses the BSR to schedule an appropriate sized UL grant and the UE sends the UL data on the grant. However, the multiple transmission may cause undesirable/unacceptable delays to the actual data transmission for certain applications. To solve this, in certain embodiments the UE may send UL data in place of the BSR, referred to herein as "direct data transmission".

Assume that the UE is configured with a Bearer A associated with URLLC service. Moreover, the UE transmit data directly in place of a BSR for the Bearer A, e.g. as fixed by specification or configured by the network using RRC signalling on a UL grant received in response to a SR configured and subsequently triggered for Bearer A. In one embodiment, the UL grant triggered for Bearer A may directly be used to transmit data for Bearer A if a dedicated SR is configured for Bearer A. In another embodiment, the UL grant triggered for Bearer A may directly be used to transmit data for Bearer A if a dedicated SR is configured for Bearer A and the network configured this bearer such that grant received in response to this SR (next grant received after the SR is sent) can only be used for data transmission from Bearer A. Here, no buffer status report is to be carried on this UL grant unless data for Bearer A is already completely accommodated in the UL grant. Alternatively, the UE may use the UL grant for direct data transmission if a dedicated SR is configured for Bearer A and its logical channel priority is higher than a certain threshold, referred to as priority_threshold_low. If 'direct data transmission' is configured for certain bearer(s), then the UE may only consider data contained in the corresponding bearer(s) for transmission while performing the LCP (Logical Channel Prioritization) procedure.

Moreover, in some embodiments, the UE may simultaneously perform SR procedure and RACH procedure for different logical channels. Here, consider a first radio bearer, Bearer A, for which SR is configured (e.g., this bearer has PUCCH resources configured for SR) and a second radio bearer, Bearer B, for which SR is not configured (e.g., this bearer is not configured with PUCCH resources for SR). When UL data arrive for Bearer B, a RACH procedure will be started as no SR is configured for Bearer B. If data in Bearer A arrives in the meantime, and then the data in Bearer A, which could be for URLLC traffic, is delayed unacceptably unless simultaneous/concurrent SR is possible. Accordingly, the UE may trigger and initiate both SR and RACH procedures in parallel.

In some embodiments, the mobile communication network may want to restrict the parallel SR and RACH procedures. To do so, it may configure whether the UE, or even certain bearers of a UE, is (or is not) allowed to trigger parallel SR and RACH procedures. Alternatively, parallel SR and RACH procedures may be controlled using logical channel priority levels and a network configured logical channel priority threshold. Here, bearers with priority lower than the certain priority_threshold_high are not allowed to initiate a RACH procedure if there is a RACH/SR procedure is already ongoing.

Further, SR in NR might be Bearer/Numerology specific and RACH might be required for other application data configured on a different Numerology for which a SR is not configured. However, in LTE, SR is "UE specific"; when a SR is configured the UE is not allowed to initiate a RACH procedure to ask for UL grant. Applying UE-specific SR to NR may lead to a starvation/delay of data transmission for a bearer/service for which SR is not configured (for any of the Numerologies mapped to this bearer/service) by the network especially if the Bearer/Numerology with configured SR resources is configured also for direct data transmission. Accordingly, in various embodiments the network configures bearers to the same logical channel group ("LCG") only if there is a common numerology (e.g. sub-carrier spacing) for bearers mapped to the LCG.

FIG. 1 depicts a wireless communication system 100 for handling multi UL access procedures, according to embodiments of the disclosure. In one embodiment, the wireless communication system 100 includes at least one remote unit 105, an access network 120 containing at least two base units 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote host via a data path that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the remote host using the PDU connection to the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 may belong to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 143, a Session Management Function ("SMF") 145, and a Policy Control Function ("PCF"). Additionally, the mobile core network 140 includes a user plane function ("UPF") 141 and a Unified Data Management ("UDM") 147. Although specific numbers and types of network functions are depicted in FIG. 1, one of skill in the art will recognize that any number and type of network functions may be included in the mobile core network 140.

Disclosed herein are methods, systems, and apparatuses for handling multi UL access procedures. Arrival of UL data 125 (e.g., generated by an application running on the remote unit 105) triggers SR. If the remote unit 105 is configured with PUCCH resources for SR, then the remote unit 105 may send a SR message 130. Otherwise, the remote unit 105 initiates a RACH procedure in response to arrival of the UL data 125. The base unit 110 identifies that the remote unit 105 requires UL resources and sends the UL grant 135.

In some embodiments, the UL data 125 arrives while another RACH procedure (e.g., associated with a different bearer) is pending. To minimize delay, the remote unit 105 may send the SR message 130 without waiting to complete the ongoing RACH procedure, thus performing both SR and RACH procedures in parallel. As mention above, simultaneous SR transmission may depend on a network configuration, a bearer configuration, a logical channel priority, or the like.

Figure 2:
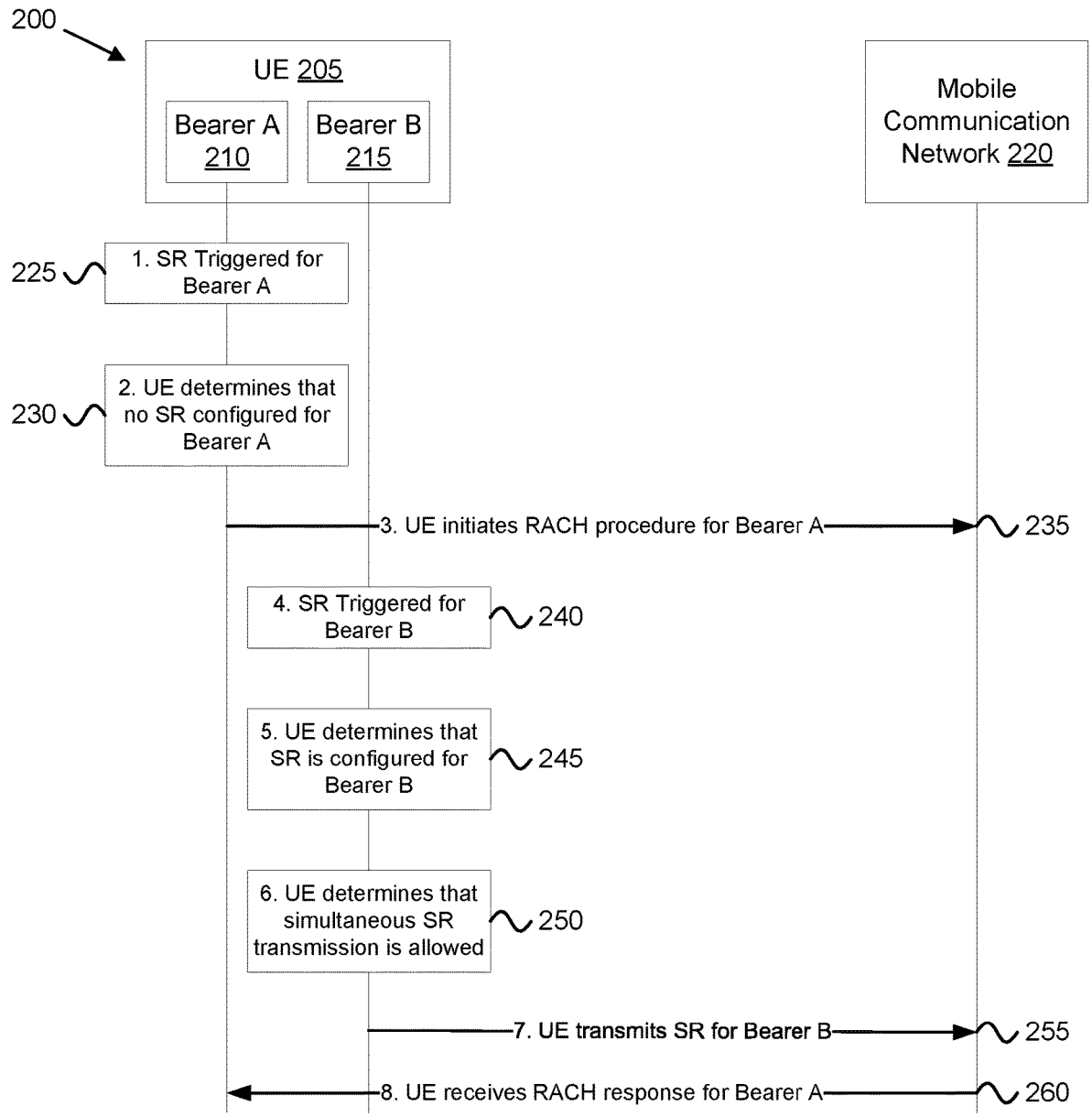
FIG. 2 is a schematic block diagram illustrating one embodiment of a network procedure for handling multi UL access procedures.

FIG. 2 depicts a network procedure 200 for handling multi UL access procedures, according to embodiments of the disclosure. The network procedure 200 involves a UE 205 and a mobile communication network$_{[BWP1]}$("MCN") 220. The UE 205 may be one embodiment of the remote unit 105, described above. Additionally, the MCN 220 may be one embodiment of the access network 120 and mobile core network 140, described above. In various embodiments, the UE 205 interacts with a base unit 110 in the MCN 220, for example a gNB or other base station.

Here, it is assumed that the UE 205 has established a first radio bearer ("Bearer A" 210) with the MCN 220. In various embodiments, the first radio bearer may include a first PDCP entity, one or more RLC entities associated with the first PDCP entity, and a first logical channel. It is also assumed that the UE 205 has established a second radio bearer ("Bearer B" 215). Similar to the first radio bearer, the second radio bearer may include a second PDCP entity, one or more RLC entities associated with the second PDCP entity, and a second logical channel. Where the UE 205 is configured to use logical channel groups, it is assumed that Bearer A 210 and Bearer B 215 are associated with different logical channel groups (thus, reporting buffer status independently of one another).

The network procedure 200 begins with the triggering of a scheduling report ("SR") at the UE 205, the triggered SR being associated with the Bearer A 210 (see block 225). In response to the pending (e.g., triggered) SR, the UE 205 determines whether PUCCH resources are configured for Bearer A 210 for the pending SR (e.g., determines whether the logical channel of Bearer A 210 is mapped to a SR configuration). In the depicted embodiment, it is assumed the Bearer A 210 is not mapped to a SR configuration, thus the UE 205 determines that SR is not configured for Bearer A 210 (see block 230).

Because no PUCCH resources are configured for Bearer A 210 for the pending SR, the UE 205 initiates a random-access procedure (e.g., "RACH procedure") for the SR of Bearer A 210 (see messaging 235). For example, the UE 205 may send a RACH Request in Msg1 when initiating the random-access procedure.

Additionally, while the RACH procedure for Bearer A 210 is pending, the UE 205 also detects the triggering of SR associated with the Bearer B 215 (see block 240). In response to the pending (e.g., triggered) SR for Bearer B 215, the UE 205 determines whether PUCCH resources are configured for Bearer B 215 for the pending SR (e.g., determines whether the logical channel of Bearer B 215 is mapped to a SR configuration). In the depicted embodiment, it is assumed the Bearer B 215 is mapped to a SR configuration, thus the UE 205 determines that SR is configured for Bearer B 215 (see block 245).

Because there is an UL access procedure pending (e.g., the RACH procedure for Bearer A 210), the UE 205 determines whether simultaneous SR transmission is allowed. For example, the UE 205 may determine whether simultaneous SR transmission is permitted in the mobile communication network 220, whether a logical channel priority of Bearer B 215 is sufficient to permit simultaneous SR transmission, and/or determine whether a configuration of Bearer B 215 permits simultaneous SR transmission. Moreover, the UE 205 may determine whether an amount of transmission power is sufficient to simultaneously transmit messages for the RACH procedure for Bearer A 210 and the scheduling request message for Bearer B 215 in parallel. In the depicted embodiment, it is assumed that simultaneous SR transmission is allowed (e.g., permitted and sufficient transmission power is available, see block 250).

Because Bearer B 215 is mapped to a SR configuration, the UE 205 transmits a SR message for Bearer B 215 using configured PUCCH resources (see messaging 255). Note that the UE 205 transmits the SR message for Bearer B 215 prior to completing the RACH procedure for Bearer A 210. In the depicted embodiment, the UE 205 receives a RACH response (e.g., for Bearer A 210) at some time after transmitting the SR message for Bearer B 215 (see messaging 260).

While the depicted embodiment assumes that Bearer A 210 has no SR configuration, in other embodiments the Bearer A 210 is configured with PUCCH resources for pending SR. In such embodiments, the UE 205 may instead send a SR message for Bearer A 210, rather than initiating the RACH procedure for Bearer A 210 as depicted. Here, the UE 205 may also send the SR message for Bearer B 215 prior to receiving a response to the SR message for Bearer A 210. In certain embodiments, the UE 205 may send SR messages for Bearer A 210 and Bearer B 215 in parallel.

Moreover, while the depicted embodiment assumes that Bearer B 215 has a SR configuration, in other embodiments the Bearer B 215 is not configured with PUCCH resources for pending SR. In such embodiments, the UE 205 may instead initiate a second RACH procedure for Bearer B 215, rather than sending a SR message on configured PUCCH resources as depicted. In certain embodiments, the UE 205 may initiate RACH procedures for Bearer A 210 and Bearer B 215 in parallel.

While the depicted embodiment assumes that simultaneous SR transmission is allowed, in other embodiments simultaneous SR transmission may not be allowed. In such embodiments, the UE 205 may optionally cancel the RACH procedure for Bearer A 210 to send the SR message (or initiate a second RACH procedure) for Bearer B 215, e.g., due to the logical channel priority of Bearer B 215 being higher than that of Bearer A 210. In certain embodiments where simultaneous SR transmission is not allowed, the UE 205 may optionally delay the SR message (or second RACH procedure) for Bearer B 215 until completion of the RACH procedure for Bearer A 210, e.g., due to a logical channel priority of Bearer B 215 being lower than or equal to that of Bearer A 210. Other embodiments are also possible, as described herein.

Figure 3:
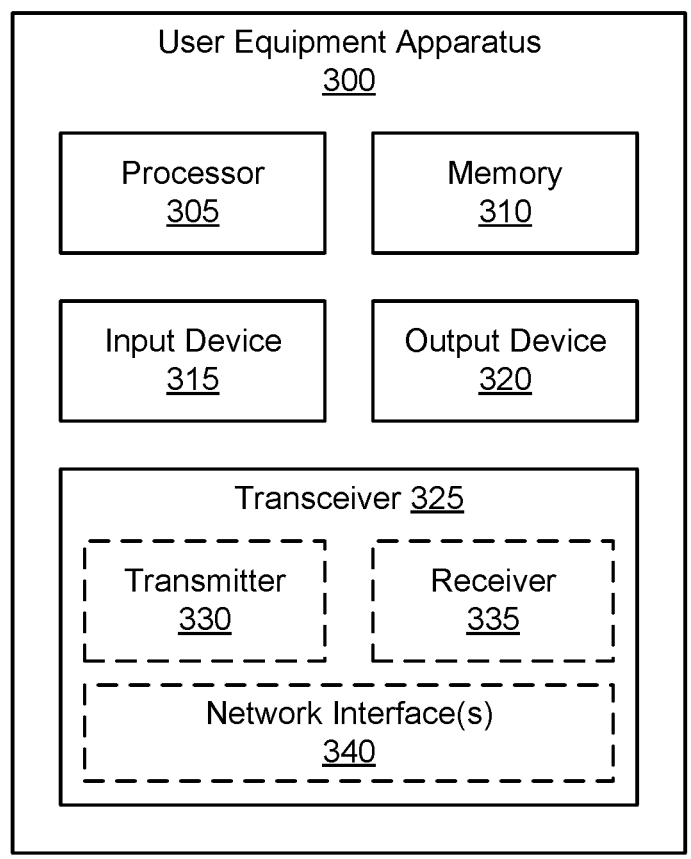
FIG. 3 is a schematic block diagram illustrating one embodiment of a user equipment apparatus for handling multi UL access procedures.

FIG. 3 depicts one embodiment of a user equipment apparatus 300 that may be used for handling multi UL access procedures, according to embodiments of the disclosure. The user equipment apparatus 300 may be one embodiment of the remote unit 105 and/or UE 205. Furthermore, the user equipment apparatus 300 may include a processor 305, a memory 310, an input device 315, an output device 320, and a transceiver 325. In some embodiments, the input device 315 and the output device 320 are combined into a single device, such as a touch screen. In certain embodiments, the user equipment apparatus 300 does not include any input device 315 and/or output device 320.

Via the transceiver 325, the user equipment apparatus 300 establishes at least two radio bearers. As discussed above, each radio bearer may be associated with a different logical channel. As depicted, the transceiver 325 includes at least one transmitter 330 and at least one receiver 335. Additionally, the transceiver 325 may support at least one network interface 340. Here, the at least one network interface 340 facilitates communication with an eNB or gNB (e.g., using the Uu interface). Additionally, the at least one network interface 340 may include an interface used for communications with an UPF and/or AMF.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 initiates a first UL access procedure for a first radio bearer. Here, the first UL access procedure may be a random-access procedure, such as the RACH procedure discussed above. In other embodiments, the first UL access procedure may be a SR request transmitted on PUCCH resources configured for a logical channel associated with the first radio bearer.

Moreover, the processor 305 may receive a SR trigger for a second radio bearer while the first UL access procedure (e.g., random-access) request remains pending. Here, the SR trigger may be the arrival of UL data associated with the second radio bearer. Note that it is assumed that the first and second radio bearers are not a part of the same logical channel group. Thus, the second radio bearer reports its buffer status independently of the first radio bearer.

In such embodiments, the processor 305 controls the transceiver 325 to transmit a first SR message for the second radio bearer prior to completing the first uplink access procedure. In some embodiments, the processor 305 determines whether simultaneous SR transmission is permitted in response to receiving the SR trigger while the first UL access procedure remains pending. In certain embodiments, simultaneous SR transmission is defined as permitted in the mobile communication network. In other embodiments, simultaneous SR transmission may be permitted if a logical channel priority of the second radio bearer is above a threshold level. In further embodiments, simultaneous SR transmission may be permitted based on the configuration of the second radio bearer.

In response to determining that simultaneous SR transmission is permitted, the processor 305 controls the transceiver 325 to transmit a first SR message for the second radio bearer. In various embodiments, the processor 305 determines whether the second radio bearer is configured with PUCCH resources for transmitting SR. Where PUCCH resourced are configured for SR, then transmitting the first SR message for the second radio bearer includes transmitting a scheduling request (e.g., an uplink PHY layer message) using one of the configured PUCCH resources. Otherwise, if no PUCCH resourced are configured for SR for the second radio bearer, then transmitting the first SR message for the second radio bearer may include initiating a RACH procedure (e.g., transmitting a RACH Request in Msg1).

In some embodiments, determining whether simultaneous SR transmission is permitted may include the processor 305 identifying a logical channel priority associated with the second radio bearer. Moreover, the processor 305 may compare the logical channel priority of the second radio bearer to a priority threshold, where the processor 305 determines that simultaneous SR transmission is permitted if the logical channel priority exceeds the priority threshold.

As mentioned, in certain embodiments the processor 305 uses a configuration of the second radio bearer to determine whether simultaneous scheduling request transmission is permitted. In other embodiments, the mobile communication network defines simultaneous scheduling request transmission as being permitted, therefore the processor 305 may always determine that simultaneous SR is permitted.

Where simultaneous SR transmission is permitted, the processor 305 may determine whether an amount of transmission power is sufficient to simultaneously transmit messages for the first UL access procedure and the first SR message in parallel. In certain embodiments, the transmitting the first scheduling request message for the second radio bearer may include reducing power of a message of a lower priority of the first radio bearer and second radio bearer.

In some embodiments, the processor 305 determines a first logical channel priority of the first radio bearer and a second logical channel priority of the second radio bearer in response to simultaneous scheduling request transmission not being permitted and cancels the first UL access procedure in response to the first logical channel priority being lower than the second logical channel priority. For example, if simultaneous SR transmission is not permitted, then the processor 305 may determine to cancel the first UL access procedure to avoid delaying the first SR message. Beneficially, this would allow SR messaging associated with critical services, such as public safety, vehicular telematics/control, emergency alerts, and the like, to have priority over other services.

In certain embodiments, the processor 305 may receive (e.g., via the transceiver 325) an uplink grant for a buffer status report in response the first SR message. In such embodiments, the processor 305 may optionally send uplink data in place of a buffer status report on the grant. In certain embodiments, the processor 305 may select an appropriate MAC control element ("CE") subheader to indicate that uplink data is sent in place of the buffer status report.

In some embodiments, the processor 305 may receive (e.g., via the transceiver 325) a backoff indicator message. As understood in the art, a backoff indicator prohibits any RACH attempts for an indicated amount of time. In such embodiments, the backoff indicator message may include one or more service identifier fields. Here, the processor 305 initiates a backoff timer for an amount of time based on the backoff indicator message only for the specific service(s) indicated by the service identifier field. In one embodiment, the service identifier field is a positive list wherein a backoff timer is initiated for the identified service(s). In another embodiment, the service identifier field is a negative list wherein a backoff timer is initiated all services but the identified service(s). Moreover, in various embodiments, the backoff indicator message may include a plurality of service identifier fields.

In some embodiments, the processor 305 receives a trigger for a first RACH request, while a second RACH procedure is pending. Here, the processor 305 may identify a first priority of the first RACH request and second priority of the second RACH procedure. If both the first priority and the second priority are high, then the processor 305 may control the transceiver 325 to transmit the first RACH request prior to completion of the second RACH procedure. In one embodiment, a RACH message requesting a SIB may be considered a high priority, while a RACH message requesting an upload grant may be considered lower priority. In another embodiment, only a RACH message requesting a critical-service SIB may be considered a high priority. Here, critical services may include, but are not limited to, emergency alerts (e.g., Commercial Mobile Alert System ("CMAS"), Wireless Emergency Alerts ("WEA"), Earthquake and Tsunami Warning System ("ETWS"), or other disaster notification systems), vehicular control/telematics, and public safety services.

In certain embodiments, the processor 305 may abort (cancel) the second (e.g., already pending) RACH procedure, e.g., in response to the first priority being high and the second priority being low. In other embodiments, the processor 305 may delay transmission of the first RACH request until completion of the second RACH procedure.

In some embodiments, the first priority and the second priority may have the same priority level. In such embodiments, the processor 305 may identify a next RACH opportunity and control the transceiver 325 to transmit the first RACH request comprises transmitting during the next RACH opportunity, even if the next RACH opportunity comes prior to receiving a response for the second random-access procedure.

In certain embodiments, transmitting the first RACH request includes simultaneously transmitting a first RACH preamble corresponding to the first RACH request and a second RACH preamble corresponding to the pending second RACH procedure. Moreover, the processor 305 may receive a first RACH response corresponding to the first RACH request and a second RACH response corresponding to the second RACH procedure, each RACH response including a RACH grant, wherein the RACH grants overlap in time. In such embodiments, the processor 305 may reduce a transmit power of a third RACH message for a lower priority of the first RACH request and the second RACH procedure due to the RACH grants overlapping in time.

In one embodiment, the processor 305 may reduce the transmit power of a retransmission opportunity of the lower priority of the first RACH request and the second RACH procedure in response to reducing the transmit power of the third RACH message for the lower priority of the first RACH request and the second RACH procedure. In certain embodiments, an amount of power reduction of the third message is based on a weighing factor. Here, the weighing factor may be selected based on the relative priority of the first priority compared to the second priority.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to handling multi UL access procedures, for example storing bearer configurations, SR configurations, logical channel priorities, backoff indicators, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
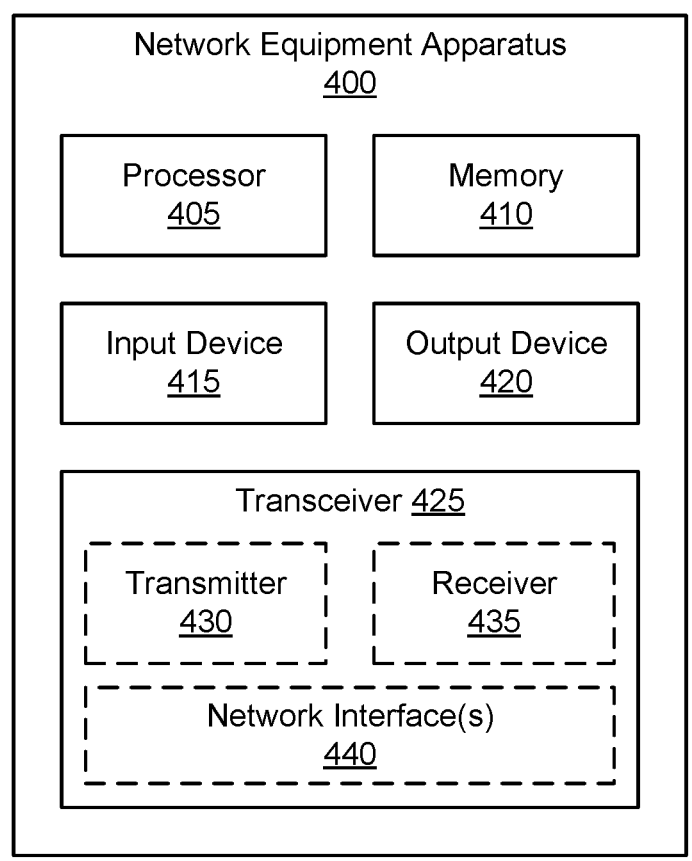
FIG. 4 is a schematic block diagram illustrating one embodiment of a network equipment apparatus for handling multi UL access procedures.

FIG. 4 depicts one embodiment of a network equipment apparatus 400 that may be used for handling multi UL access procedures, according to embodiments of the disclosure. The network equipment apparatus 400 may be one embodiment of the base unit 110 and/or the gNB 210. Furthermore, the network equipment apparatus 400 may include a processor 405, a memory 410, an input device 415, an output device 420, and a transceiver 425. In some embodiments, the input device 415 and the output device 420 are combined into a single device, such as a touch screen. In certain embodiments, the network equipment apparatus 400 does not include any input device 415 and/or output device 420.

As depicted, the transceiver 425 includes at least one transmitter 430 and at least one receiver 435. Additionally, the transceiver 425 may support at least one network interface 440. Here, the at least one network interface 440 facilitates communication with a remote unit 105, such as the UE 205, with other network functions in a mobile core network 140, such as the UPF 141, AMF 143, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 establishes at least two radio bearers to communicate with a UE, such as the UE 205. Here, each radio bearer may include a PDCP protocol entity, at least one RLC protocol entity associated with said PDCP protocol entity, and an associated logical channel. In certain embodiments, the processor 405 may configure a radio bearer with PUCCH resources for transmitting SR.

In some embodiments, the processor 405 receives a UL access request from a UE. Here, the UL access request may be a SR send on configured PUCCH resources or a RACH procedure. In response to the UL access request, the processor 405 may then schedule UL resources to the UE for communicating a buffer status report and indicate the UL resources by sending a UL grant message to the UE. In certain embodiments, the processor 405 may receive UL data in the UL grant in place of the buffer status report. In one embodiment, a MAC CE subheader associated with the UL grant indicates that the UE is sending UL data rather than a buffer status report.

In some embodiments, the processor 405 may send a backoff indicator message to the UE in response to the UL access request. In such embodiments, the backoff indicator message may include one or more service identifier fields. Here, the processor 405 identifies one or more the specific services using the service identifier field. Upon receiving the backoff indicator message, the UE imitates a backoff timer.

In one embodiment, the service identifier field is a positive list wherein a backoff timer is initiated for the identified service(s). In another embodiment, the service identifier field is a negative list wherein a backoff timer is initiated all services but the identified service(s). Moreover, in various embodiments, the backoff indicator message may include a plurality of service identifier fields.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to handling multi UL access procedures, for example storing bearer configurations, SR configurations, backoff indicators, and the like. In certain embodiments, the memory 410 also stores program code and related data, such as an operating system or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5:
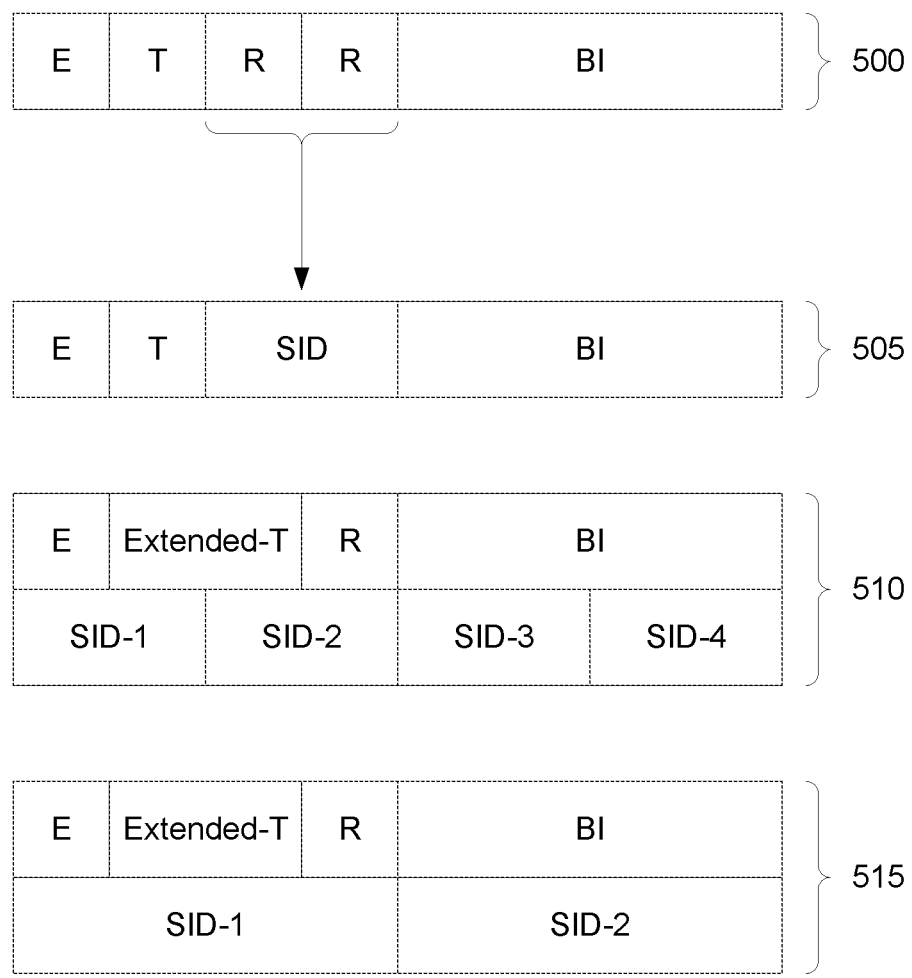
FIG. 5 is a diagram illustrating embodiments of enhanced backoff indicators for handling multi UL access procedures.

FIG. 5 depicts various embodiments of enhanced backoff indicator messages, according to embodiments of the disclosure. In certain embodiments, the enhanced backoff indicator messages form part of a MAC header or subheader. Here, an LTE backoff indicator message 500 is depicted having a plurality of fields (having an 'E/T/R/R/BI' format). The 'E' field is a 1-bit field that indicates whether there is another subheader following the present subheader or not. For example, a value of '1' may indicate there is at least one following subheader, while a value of '0' may indicate there are no more subheaders, implying that the next byte is the start byte of MAC SDU or MAC CE or Padding. The 'T' field (type field) is a 1-bit field that may be used to distinguish a backoff indicator message from another MAC header/subheader. For example, in LTE, the 'T' field is used to distinguish a subheader containing a backoff indicator from a subheader containing a Random-Access ID. The 'R' fields are reserved in LTE and the 'BI' field (backoff indicator field) is a 4-bit field that indicates an amount of time the UE is to wait before initiating a RACH procedure.

Because 5G networks are expected to serve different "verticals," e.g., by supporting different network slices that reserve appropriate resources in the network, different verticals or services may have different requirements and different QOS characteristics (referred to as '5QI'), including priorities and preemption possibility. Additionally, a mobile communication network has certain capacity of how many UEs (load) it can handle and when loaded it may need to take appropriate action including barring certain UEs (e.g., Access Classes), prohibiting RACH access, releasing some RRC Connected UEs etc. One mechanism to prohibit RACH access is to send a backoff indicator, causing the UE to forgo any RACH attempts for a certain Backoff timer. In 5G, however, for some verticals/services it is quite important to be minimize delay.

In a first enhanced backoff indicator message 505, the reserved fields of the LTE message are replaced with a Service ID ('SID') field used to identify a particular service associated with the backoff indicator. In various embodiments, the UE does not backoff all services simultaneously in response to the backoff indicator message/subheader, but instead initiates a backoff timer for the identified service. In the first enhanced backoff indicator message 505 the SID field is a 2-bit field which can signal up to four different services. When reading the first enhanced backoff indicator message 505, the UE notes that the type field ('T') indicates a backoff indicator and reads the following two bits to identify the service to backoff.

In the second enhanced backoff indicator 510 and third enhanced backoff indicator 515, the 'T' field and a reserved field of the LTE message are replaced with an extended type field ('Extended-T'). Here, the extended type field is a 2-bit field which can signal up to four different meanings. A first value may be used to indicate that the MAC subheader contains a Random-Access ID. A second value may be used to indicate that the MAC subheader contains a backoff indicator for all services (e.g., no SID included). A third value may be used to indicate that the MAC subheader contains a backoff indicator and a positive list of SIDs. A fourth value may be used to indicate that the MAC subheader contains a backoff indicator and a negative list of SIDs. As used here, a positive list means that the backoff indicator is applicable to each listed service, while a negative list means that the backoff indicator is applicable to all services except those listed.

Note that the backoff indicator messages with SID lists comprise two or more bytes. Here, the second enhanced backoff indicator 510 and third enhanced backoff indicator 515 are both two-byte messages with the SID lists taking up one byte. Moreover, the SID field may be any suitable size. In the second enhanced backoff indicator 510 each SID field is a 2-bit field used to identify one of up to four different services. In the third enhanced backoff indicator 515 each SID field is a 4-bit field used to identify one of up to 16 different services.

The disclosed enhanced backoff indicator is not to be limited to the depicted examples. In some embodiments, the SID field is used to indicate an "Access Reason Identifier" rather than a specific service. For example, a first value may correspond to a beam failure recovery request, a second value may correspond to a URLLC application, and a third value may correspond to a SI request, with the fourth value being applicable to all other access reasons. In a further example, the mobile communication network may be configured to never back off one of a beam failure recovery request, URLLC application, or SI request. In such a situation, a value of the SID field may then correspond to eMBB data. In other examples, the SID field may apply to other categories of services/applications.

In certain embodiments, the value in the 'BI' field (backoff indicator field) may apply differently to different services, applications, or access reasons. For example, the SIB may indicate scale factors applicable to the different services/application/access reasons. Here, the scale factor may be applied to the backoff indicator to shorten or extend the backoff time. In other embodiments, separate backoff indicator messages/subheaders may be sent so that different services/application/access reasons are backed off differently.

Figure 6:
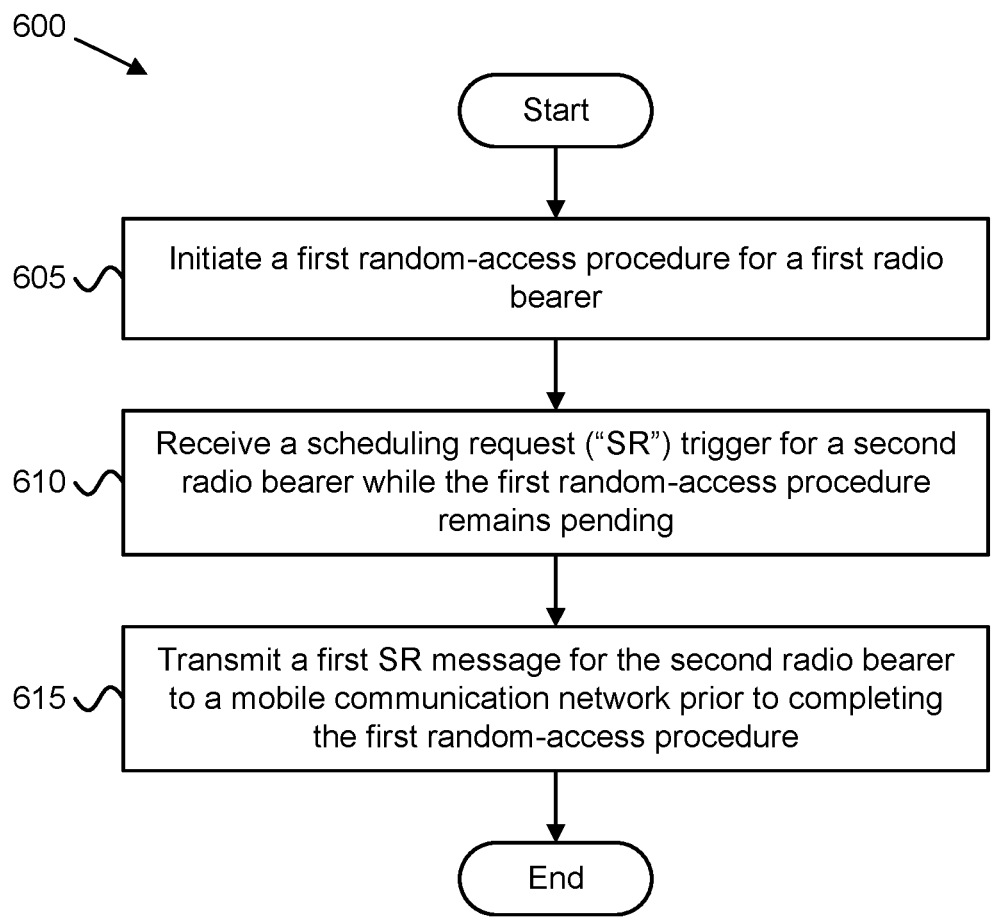
FIG. 6 is a flowchart diagram illustrating a first embodiment of a method for handling multi UL access procedures.

FIG. 6 depicts a method 600 for handling multi UL access procedures, according to embodiments of the disclosure. In some embodiments, the method 600 is performed by a remote unit, such as the remote unit 105, the UE 205, and/or the user equipment apparatus 300, described above. In some embodiments, the method 600 is performed by a processor executing program code, for example, a microcontroller, a microprocessor, a CPU, a GPU, an auxiliary processing unit, a FPGA, or the like.

The method 600 begins and initiates 605 a first random-access procedure for a first radio bearer. Here, the first radio bearer may be associated with a first logical channel and report its buffer status independently of a second radio bearer. The method 600 includes receiving 610 a SR trigger for the second radio bearer while the first random-access procedure remains pending.

The method 600 includes transmitting 615, to a mobile communication network, a first SR message for the second radio bearer prior to completing the first random-access procedure. The method 600 ends. In one embodiment, the second radio bearer is configured with PUCCH resources for pending SR. Here, transmitting 615 the first SR message includes sending the scheduling request on the configured PUCCH resources. In another embodiment, the second radio bearer is not configured with PUCCH resources for pending SR. Here, transmitting 615 the first SR message includes initiating a second random-access procedure.

Figure 7:
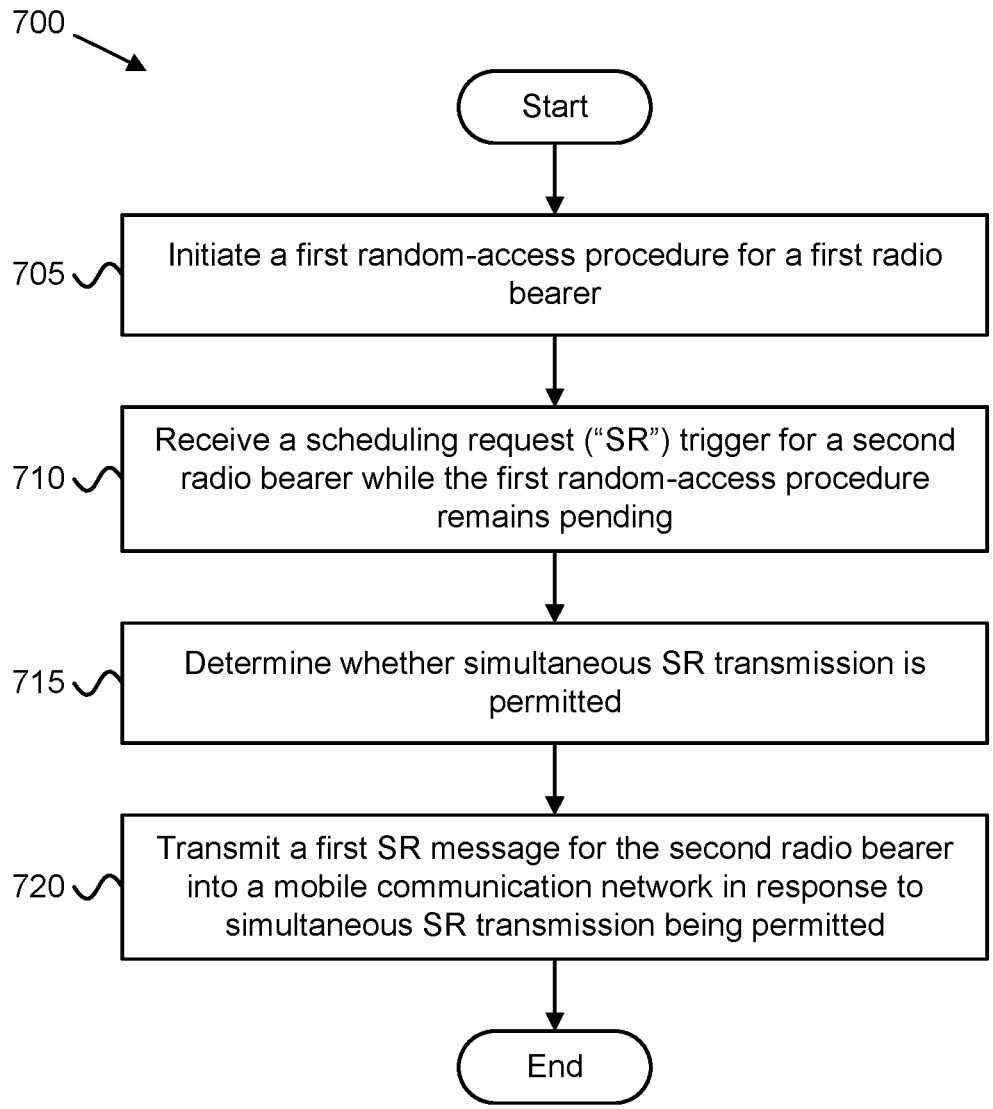
FIG. 7 is a flowchart diagram illustrating a second embodiment of a method for handling multi UL access procedures.

FIG. 7 depicts a method 700 for handling multi UL access procedures, according to embodiments of the disclosure. In some embodiments, the method 700 is performed by a remote unit, such as the remote unit 105, the UE 205, and/or the user equipment apparatus 300, described above. In some embodiments, the method 700 is performed by a processor executing program code, for example, a microcontroller, a microprocessor, a CPU, a GPU, an auxiliary processing unit, a FPGA, or the like.

The method 700 begins and initiates 705 a first random-access procedure for a first radio bearer. Here, the first radio bearer may be associated with a first logical channel and report its buffer status independently of a second radio bearer. The method 700 includes receiving 710 a its SR trigger for the second radio bearer while the first random-access procedure remains pending. Here, the SR trigger may be due to receiving UL data for the second radio bearer.

The method 700 include determining 715 whether simultaneous SR is permitted. In one embodiment, the mobile communication network defines simultaneous SR transmission as being permitted. In other embodiments, determining 715 whether simultaneous SR transmission is permitted is based on a configuration of the second radio bearer. In certain embodiments, determining 715 whether simultaneous SR transmission is permitted comprises identifying a logical channel priority associated with the second radio bearer. Here, simultaneous SR transmission may be permitted if the logical channel priority exceeds a priority threshold.

The method 700 includes transmitting 720, to a mobile communication network, a first SR message for the second radio bearer prior to completing the first random-access procedure in response to simultaneous scheduling request transmission being permitted. The method 700 ends. In some embodiments, transmitting 720 the first SR message for the second radio bearer may include reducing power of a message of a lower priority of the first radio bearer and second radio bearer. For example, the apparatus may determine whether an amount of transmission power is sufficient to simultaneously transmit messages for the first random-access procedure and the first scheduling request message in parallel and reduce the power of the lower priority message based on the determination.

In one embodiment, the second radio bearer is configured with PUCCH resources for pending SR. Here, transmitting 720 the first SR message includes sending the scheduling request on the configured PUCCH resources. In another embodiment, the second radio bearer is not configured with PUCCH resources for pending SR. Here, transmitting 720 the first SR message includes initiating a second random-access procedure.

Figure 8:
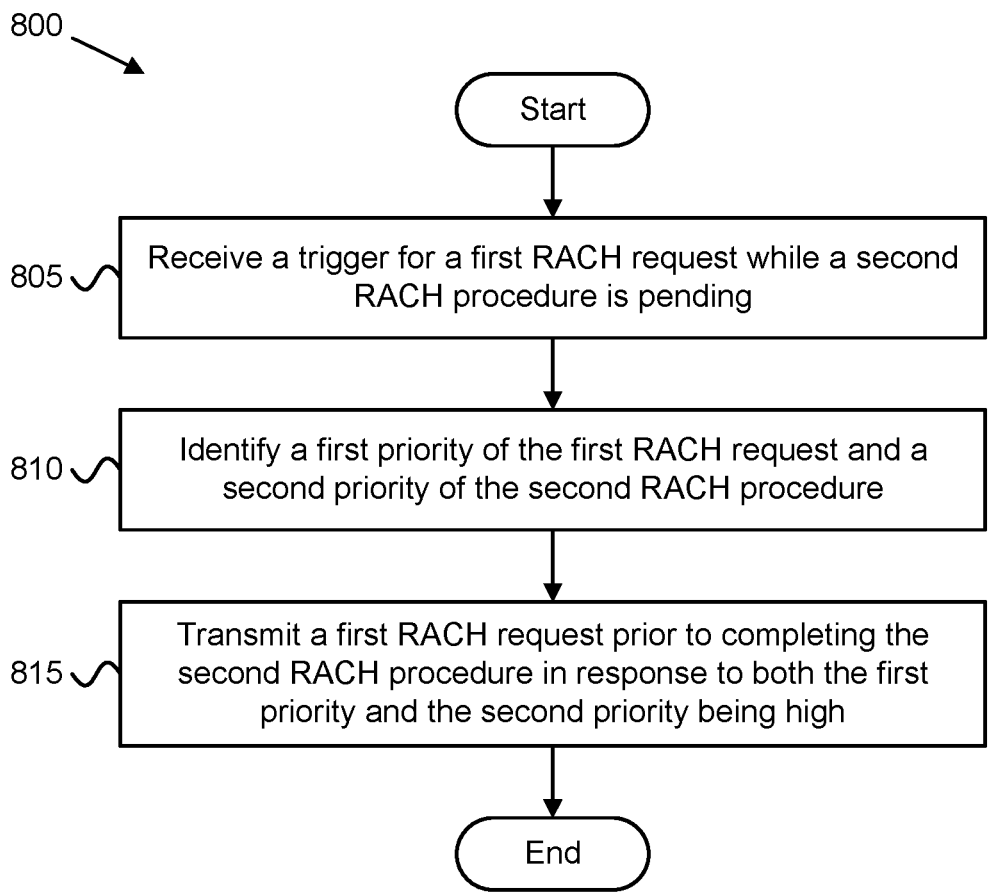
FIG. 8 is a flowchart diagram illustrating a third embodiment of a method for handling multi UL access procedures.

FIG. 8 depicts a method 800 for handling multi UL access procedures, according to embodiments of the disclosure. In some embodiments, the method 800 is performed by a remote unit, such as the remote unit 105, the UE 205, and/or the user equipment apparatus 300, described above. In some embodiments, the method 800 is performed by a processor executing program code, for example, a microcontroller, a microprocessor, a CPU, a GPU, an auxiliary processing unit, a FPGA, or the like.

The method 800 begins and receives 805 a trigger for a first RACH request, while a second RACH procedure is pending. In one embodiment, the trigger for a first RACH request is due to UL data arrival. In another embodiment, the first RACH request is a System Information is request, e.g., to request a SIB.

The method 800 includes identifying 810 a first priority of the first RACH request and second priority of the second RACH procedure. In certain embodiments, a request for a SIB has higher priority than another type of RACH request. In some embodiments, the first priority and the second priority are the same priority level.

The method 800 includes transmitting 815 the first RACH request prior to completion of the second RACH procedure in response to both the first priority and the second priority being high. The method 800 ends. In some embodiments, transmitting 815 the first RACH request includes transmitting the first RACH request during a next RACH opportunity prior to receiving a response for the second random-access procedure. In certain embodiments, transmitting 815 the first RACH request includes simultaneously transmitting a first RACH preamble corresponding to the first RACH request and a second RACH preamble corresponding to the pending second RACH procedure.

Disclosed herein is a first apparatus for handling multi LTL access procedures. The first apparatus includes a processor and a transceiver that communicates with a mobile communication network using a plurality of radio bearers. The processor initiates a first random-access procedure for a first radio bearer and receives a scheduling request trigger for a second radio bearer while the first random-access procedure remains pending. Moreover, the processor determines whether simultaneous scheduling request transmission is permitted, and the transceiver transmits a first scheduling request message for the second radio bearer in response to simultaneous scheduling request transmission being permitted.$_{[BWP2]}$ In certain embodiments of the first apparatus, determining whether simultaneous scheduling request transmission is permitted comprises identifying a logical channel priority associated with the second radio bearer. In such embodiments, the first apparatus may include comparing the logical channel priority associated with the second radio bearer to a first priority threshold, wherein simultaneous scheduling request transmission is permitted if the logical channel priority exceeds the first priority threshold.

In certain embodiments of the first apparatus, determining whether simultaneous scheduling request transmission is permitted is based on a configuration of the second radio bearer. In other embodiments of the first apparatus, the mobile communication network may define simultaneous scheduling request transmission as being permitted.

In some embodiments of the first apparatus, the processor determines whether an amount of transmission power is sufficient to simultaneously transmit messages for the first random-access procedure and the first scheduling request message in parallel, in response to simultaneous scheduling request transmission being permitted. In such embodiments of the first apparatus, transmitting the first scheduling request message for the second radio bearer comprises reducing power of a message of a lower priority of the first radio bearer and second radio bearer.

In some embodiments of the first apparatus, the processor determines a first logical channel priority of the first radio bearer and a second logical channel priority of the second radio bearer in response to simultaneous scheduling request transmission not being permitted and cancels the first random-access procedure in response to the first logical channel priority being lower than the second logical channel priority.

In various embodiments of the first apparatus, the second radio bearer is not configured with any PUCCH resource for the first scheduling request message. In such embodiments, transmitting the first scheduling request message comprises initiating a second random-access procedure. In some embodiments of the first apparatus, the processor receives a buffer status report grant for a buffer status report in response the first scheduling request message and controls the transceiver to transmitting uplink data on the buffer status report grant.

In some embodiments of the first apparatus, the processor receives a backoff indicator message, the backoff indicator message including a service identifier field and initiating a backoff timer for a specific service for an amount of time based on the backoff indicator message. In various embodiments of the first apparatus, the backoff indicator message includes a plurality of service identifier fields. In certain embodiments, the backoff indicator applies to each service identified in the plurality of service identifier fields. In other embodiments, the backoff indicator applies to all services except those identified in the plurality of service identifier fields.

Disclosed herein is a first method for handling multi UL access procedures. The first method includes initiating, by a first remote unit, a first random-access procedure for a first radio bearer and receiving, at the remote unit, a scheduling request trigger for a second radio bearer while the first random-access procedure remains pending. The first method also includes determining whether simultaneous scheduling request transmission is permitted and transmitting, by the remote unit, a first scheduling request message for the second radio bearer to a mobile communication network in response to simultaneous scheduling request transmission being permitted.

In certain embodiments of the first method, determining whether simultaneous scheduling request transmission is permitted comprises identifying a logical channel priority associated with the second radio bearer. In such embodiments, the first method may include comparing the logical channel priority associated with the second radio bearer to a first priority threshold, wherein simultaneous scheduling request transmission is permitted if the logical channel priority exceeds the first priority threshold.

In certain embodiments of the first method, determining whether simultaneous scheduling request transmission is permitted is based on a configuration of the second radio bearer. In other embodiments of the first method, the mobile communication network may define simultaneous scheduling request transmission as being permitted.

In some embodiments, the first method also includes determining whether an amount of transmission power is sufficient to simultaneously transmit messages for the first random-access procedure and the first scheduling request message in parallel, in response to simultaneous scheduling request transmission being permitted. In such embodiments of the first method, transmitting the first scheduling request message for the second radio bearer comprises reducing power of a message of a lower priority of the first radio bearer and second radio bearer.

In some embodiments, the first method includes determining a first logical channel priority of the first radio bearer and a second logical channel priority of the second radio bearer in response to simultaneous scheduling request transmission not being permitted and cancelling the first random-access procedure in response to the first logical channel priority being lower than the second logical channel priority.

In various embodiments of the first method, the second radio bearer is not configured with any PUCCH resource for the first scheduling request message. In such embodiments, transmitting the first scheduling request message comprises initiating a second random-access procedure. In some embodiments, the first method includes receiving a buffer status report grant for a buffer status report in response the first scheduling request message and transmitting uplink data on the buffer status report grant.

In some embodiments, the first method includes receiving a backoff indicator message, the backoff indicator message including a service identifier field and initiating a backoff timer for a specific service for an amount of time based on the backoff indicator message. In various embodiments of the first method, the backoff indicator message includes a plurality of service identifier fields. In certain embodiments, the backoff indicator applies to each service identified in the plurality of service identifier fields. In other embodiments, the backoff indicator applies to all services except those identified in the plurality of service identifier fields.

Disclosed herein is a second method for handling multi UL access procedures. The second method includes initiating, by a remote unit, a first random-access procedure for a first radio bearer and receiving, at the remote unit, a scheduling request trigger for a second radio bearer while the first random-access procedure remains pending. The second method includes transmitting, by the remote unit, a first scheduling request message for the second radio bearer to a mobile communication network prior to completing the first random-access procedure.

In certain embodiments, the second method include determining that simultaneous scheduling request transmission is permitted prior to transmitting the first scheduling request message. In one embodiment, a logical channel priority of the second radio bearer indicates that simultaneous scheduling request transmission is permitted. In another embodiment, a configuration of the second radio bearer indicates that simultaneous scheduling request transmission is permitted. In other embodiments of the second method, the mobile communication network may define simultaneous scheduling request transmission as being permitted.

In some embodiments, the second method also includes determining whether an amount of transmission power is sufficient to simultaneously transmit messages for the first random-access procedure and the first scheduling request message in parallel. In such embodiments of the second method, transmitting the first scheduling request message for the second radio bearer may include reducing power of a message of a lower priority of the first radio bearer and second radio bearer.

In various embodiments of the second method, the second radio bearer is not configured with any PUCCH resource for the first scheduling request message. In such embodiments, transmitting the first scheduling request message comprises initiating a second random-access procedure. In some embodiments, the second method includes receiving a buffer status report grant for a buffer status report in response the first scheduling request message and transmitting uplink data on the buffer status report grant.

In some embodiments, the second method includes receiving a backoff indicator message, the backoff indicator message including a service identifier field and initiating a backoff timer for a specific service for an amount of time based on the backoff indicator message. In various embodiments of the second method, the backoff indicator message includes a plurality of service identifier fields. In certain embodiments, the backoff indicator applies to each service identified in the plurality of service identifier fields. In other embodiments, the backoff indicator applies to all services except those identified in the plurality of service identifier fields.

Disclosed herein is a third method for handling multi UL access procedures. The third method includes receiving a trigger for a first random-access channel ("RACH") request, while a second RACH procedure is pending and identifying a first priority of the first RACH request and second priority of the second RACH procedure. The third method also includes transmitting the first RACH request prior to completion of the second RACH procedure in response to both the first priority and the second priority being high.

In certain embodiments, the third method includes aborting the second RACH procedure in response to the first priority being high and the second priority being low and delaying transmission of the first RACH request until completion of the second RACH procedure in response to the first priority being lower than the second priority.

In certain embodiments of the third method, the first RACH request is a request for a system information block ("SIB"), wherein a request for a SIB has higher priority than another type of RACH request. In certain embodiments of the third method, the first priority and the second priority are the same priority level, wherein transmitting the first RACH request comprises transmitting during a next RACH opportunity prior to receiving a response for the second random-access procedure. In certain embodiments of the third method, transmitting the first RACH request comprises simultaneously transmitting a first RACH preamble corresponding to the first RACH request and a second RACH preamble corresponding to the pending second RACH procedure.

In some embodiments, the third method includes receiving a first RACH response corresponding to the first RACH request and a second RACH response corresponding to the second RACH procedure, each RACH response including a RACH grant, wherein the RACH grants overlap in time. In such embodiments, simultaneously transmitting the first RACH preamble and the second RACH preamble comprises reducing a transmit power of a third RACH message for a lower priority of the first RACH request and the second RACH procedure. In one embodiment, the third method includes reducing a transmit power of a retransmission opportunity of the lower priority of the first RACH request and the second RACH procedure. In certain embodiments, an amount of power reduction of the third message is based on a weighing factor, the weighing factor being selected based on the relative priority of the first priority compared to the second priority.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a user equipment device ("UE") comprising:
   initiating a first random-access procedure for a first radio bearer, wherein the first radio bearer is associated with a first logical channel ("LCH") and is not configured with any physical uplink control channel ("PUCCH") resource for scheduling request messaging;
   receiving an internally-generated scheduling request trigger for a second radio bearer while the first random-access procedure remains pending, the second radio bearer being associated with a second LCH different than the first LCH, wherein the second radio bearer is configured with PUCCH resources for scheduling request messaging;
   determining whether simultaneous scheduling request transmission is permitted for the second bearer in response to the first random-access procedure being pending; and
   transmitting a first scheduling request message for the second radio bearer to a mobile communication network using PUCCH resources configured for scheduling request messaging in response to simultaneous scheduling request transmission being permitted for the second bearer.

2. The method of claim 1, wherein determining whether simultaneous scheduling request transmission is permitted comprises identifying a logical channel priority associated with the second radio bearer.

3. The method of claim 2, further comprising comparing the logical channel priority associated with the second radio bearer to a first priority threshold, wherein simultaneous scheduling request transmission is permitted if the logical channel priority exceeds the first priority threshold.

4. The method of claim 1, wherein determining whether simultaneous scheduling request transmission is permitted is based on a configuration of the second radio bearer.

5. The method of claim 1, wherein the mobile communication network defines simultaneous scheduling request transmission as being permitted.

6. The method of claim 1, further comprising determining whether an amount of transmission power is sufficient to simultaneously transmit messages for the first random-access procedure and the first scheduling request message in parallel, in response to simultaneous scheduling request transmission being permitted, wherein transmitting the first scheduling request message for the second radio bearer comprises reducing power of a message of a lower priority of the first radio bearer and second radio bearer.

7. The method of claim 1, further comprising:
   determining a first logical channel priority of the first radio bearer and a second logical channel priority of the second radio bearer in response to simultaneous scheduling request transmission not being permitted; and
   cancelling the first random-access procedure in response to the first logical channel priority being lower than the second logical channel priority.

8. The method of claim 1, further comprising:
   receiving a buffer status report grant for a buffer status report in response to the first scheduling request message; and
   transmitting uplink data on the buffer status report grant.

9. The method of claim 1, further comprising:
   receiving a backoff indicator message, the backoff indicator message including a service identifier field; and
   initiating a backoff timer for a specific service for an amount of time based on the backoff indicator message.

10. The method of claim 9, wherein the backoff indicator message includes a plurality of service identifier fields, wherein the backoff indicator applies to each service identified in the plurality of service identifier fields.

11. The method of claim 9, wherein the backoff indicator message includes a plurality of service identifier fields, wherein the backoff indicator applies to all services except those identified in the plurality of service identifier fields.

12. An apparatus comprising:
- a transceiver that communicates with a mobile communication network using a plurality of radio bearers; and
- a processor that:
- initiates a first random-access procedure for a first radio bearer, wherein the first radio bearer is associated with a first logical channel ("LCH") and is not configured with any physical uplink control channel ("PUCCH") resource for scheduling request messaging;
- receives an internally-generated scheduling request trigger for a second radio bearer while the first random-access procedure remains pending, the second radio bearer being associated with a second LCH different than the first LCH, wherein the second radio bearer is configured with PUCCH resources for scheduling request messaging; and
- determines whether simultaneous scheduling request transmission is permitted for the second bearer in response to the first random-access procedure being pending,
- wherein the transceiver transmits a first scheduling request message for the second radio bearer using the PUCCH resources of the second bearer configured for scheduling request messaging in response to simultaneous scheduling request transmission being permitted for the second bearer.

13. The apparatus of claim 12, wherein determining whether simultaneous scheduling request transmission is permitted comprises the processor identifying a logical channel priority associated with the second radio bearer, wherein simultaneous scheduling request transmission is permitted if the logical channel priority exceeds a priority threshold.

14. The apparatus of claim 12, wherein the processor uses a configuration of the second radio bearer to determine whether simultaneous scheduling request transmission is permitted.

15. The apparatus of claim 12, wherein the mobile communication network defines simultaneous scheduling request transmission as being permitted.

16. The apparatus of claim 12, wherein the processor further:
- determines a first logical channel priority of the first radio bearer and a second logical channel priority of the second radio bearer in response to simultaneous scheduling request transmission not being permitted; and
- cancels the first random-access procedure in response to the first logical channel priority being lower than the second logical channel priority.

17. The apparatus of claim 12, wherein the transceiver receives a backoff indicator message, the backoff indicator message including a service identifier field, wherein the processor initiates a backoff timer for a specific service for an amount of time based on the backoff indicator message.

18. The apparatus of claim 17, wherein the backoff indicator message includes a plurality of service identifier fields, wherein the backoff indicator applies to each service identified in the plurality of service identifier fields.

19. A method of a user equipment device ("UE") comprising:
- initiating a first random-access procedure for a first radio bearer, wherein the first radio bearer is associated with a first logical channel ("LCH") and is not configured with any physical uplink control channel ("PUCCH") resource for scheduling request messaging;
- receiving an internally-generated scheduling request trigger for a second radio bearer while the first random-access procedure remains pending, wherein the second radio bearer is configured with PUCCH resources for scheduling request messaging, the second radio bearer being associated with a second LCH different than the first LCH; and
- transmitting a first scheduling request message for the second radio bearer to a mobile communication network using the PUCCH resources of the second bearer configured for scheduling request messaging prior to completing the first random-access procedure in response to receiving the scheduling request trigger while the first random-access procedure being pending.

\* \* \* \* \*